(12) United States Patent
Hou et al.

(10) Patent No.: US 8,325,348 B2
(45) Date of Patent: Dec. 4, 2012

(54) LASER INTERFEROMETER SYSTEM FOR MEASURING ROLL ANGLE

(75) Inventors: Wenmei Hou, Shanghai (CN); Xianbin Zhao, Shanghai (CN); Yunbo Zhang, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 489 days.

(21) Appl. No.: 12/541,564

(22) Filed: Aug. 14, 2009

(65) Prior Publication Data

US 2010/0141957 A1 Jun. 10, 2010

(30) Foreign Application Priority Data

Aug. 15, 2008 (CN) .......................... 2008 1 0054144

(51) Int. Cl.
*G01B 11/02* (2006.01)
(52) U.S. Cl. ...................................................... 356/487
(58) Field of Classification Search .................. 356/487, 356/493, 498
See application file for complete search history.

(56) References Cited

U.S. PATENT DOCUMENTS

| 3,790,284 | A | | 2/1974 | Baldwin |
| 4,787,747 | A | * | 11/1988 | Sommargren et al. ........ 356/487 |
| 5,056,921 | A | | 10/1991 | Chaney |
| 2003/0164948 | A1 | * | 9/2003 | Hill ............................... 356/487 |

FOREIGN PATENT DOCUMENTS

| CN | 1335483 A | 2/2002 |
| CN | 101339012 A | 1/2009 |

OTHER PUBLICATIONS

Wei Gao et al., "Measurement and Control of Rolling of a Precision Moving Table", Oct. 28-31, 1997, 5 pages.
Zhongping Fang, "Precision Laser Roll Detector for Instrument & Machine Tool Metrology", Jun. 9, 1993, 275 pages.
Yin Chunyong et al., "Measurement Method of the Rolling Angle", Journal of Tsinghua University, Oct. 22, 1995, 6 pages, (English abstract included).

(Continued)

*Primary Examiner* — Tarifur Chowdhury
*Assistant Examiner* — Jonathon Cook
(74) *Attorney, Agent, or Firm* — Harrity & Harrity, LLP

(57) ABSTRACT

A laser interferometer system for measuring roll angle around the direction of linear displacement comprises a light source of a frequency stabilized input beam (15) with two linear orthogonally polarized components which may or may not be of the same frequency, a polarizing beam splitting prism, two quarter-wave retardation plates, a corner cube retroreflector, a prism assembly, attached to the mechanical apparatus whose roll angle of travel is to be measured, a wedge mirror assembly, a polarizer, a photoelectric detector, and a phase meter; the light source emits a frequency-stable incident beam and generates a stable electric reference signal; under the actions of the polarizing beam splitting prism, quarter-wave plate and corner cube retroreflector, the incident beam travels twice through and then reflected twice by the wedge mirror assembly, and finally exits from the polarizing beam splitting prism. The polarizer mixes the orthogonal components of the output beam and the photoelectric detector generates an electric signal and then the phase meter compares the phase difference of said electric measurement signal with said electric reference signal, then the roll angle of travel can be measured. The advantage of present invention is: the system has simple structure but with high measurement precision, it can be applied to the precision geometrical measurement and the establishment of precision benchmark metrology in wide high-tech fields such as military industry, aerospace engineering and digital controlled machine tools.

15 Claims, 4 Drawing Sheets

OTHER PUBLICATIONS

Hong Jiang et al., "Sensitivity Enhanced Roll Angle Measurement", Feb. 2000, pp. 516-519.

Ma Junshan et al., "Optical Precision Measurement Technique of Rolling Error", Mar. 16, 2000, 4 pages. (English abstract included).

* cited by examiner

LASER INTERFEROMETER SYSTEM FOR MEASURING ROLL ANGLE

FIELD OF THE INVENTION

The present invention generally relates to laser system for precision measurement and, more particularly, to a laser interferometer system for measuring roll angle, the rotation motion around the displacement axis.

DESCRIPTION OF PRIOR ART

The precision benchmark metrology and the precision measurement for geometrical quantities are important in high-tech fields such as military industry, aerospace engineering and digital controlled machine tools, among which especially the technique for measuring roll angle has received more and more attention, because for lack of suitable measuring method. Traditional method of interferometer measurement for roll angle is quite complicated, of which the key technique is using a plane reflection mirror in the same length as that of travel path and typically mounted on and moving with the moving body to be measured, incident beam from the source is reflected by this mirror and then detected by a photoelectric detector. Whenever a roll angle occurs on the body to be measured, the target position of the reflected beam on the receiving surface of the photoelectric detector changes, then the roll angle can be measured according to the principle of auto-collimation. Methods like this can achieve high resolution, but suffer from various disturbances. In this respect, U.S. Pat. No. 3,790,284 to R. R. Baldwin, entitled "Interferometer system for measuring straightness and roll" discloses an interferometer for measuring straightness and roll which application is however limited due to the requirement of two expensive Wollaston prism and difficult orientation of the target mirror to the Wollaston prism. U.S. Pat. No. 5,056,921 to Chaney discloses an interference approach. Two differential PSD receivers are used in Wei Gao et al.: "Measurement and control of rolling of a precision moving table [A]" (Proceedings of the IEEE International Conference on Intelligent Processing Systems [C] Oct. 28-31, 1997: 70-74) to realize a difference approach by means of an auto-collimation laser, whereby anti-disturbance was improved. On the other hand, with above methods a high demand was made on the surface quality of the plane reflection mirror, which is not beneficial for lowering the cost. Furthermore, the surface quality of the plane reflection mirror is subject to temperature and stress deformation, thus the reliability of the measurement is reduced.

Further, there is a roll angle measurement based on a combination of a quarter-wave plate and a polarizer. According to optics principle, if the axis of a quarter-wave plate is placed in 45 degrees with the polarizing direction of a linear polarizing light, two linear orthogonally polarized lights can be transformed into two opposed circular polarized lights. The polarizer is attached to the object to be measured, when the object rolls, the polarizer functioning as the roll angle sensor will rotates alongside, this rotation will make the two opposed circular polarized lights produce opposed phase shifts and leads to a phase change of the output optical signal received by a photoelectric detector, thus the change of the roll angle is known. Furthermore, the phase change has a 2 times linear relation to the roll angle, thus a whole circle measurement can be obtained. Due to the effectiveness of this method, it has even been applied to the measurement of the roll angles such as that of missiles or other flying bodies. Faraday magneto-optical effect has been applied to realize the roll angle measurement based on the combination of quarter-wave plate and polarizer in Fang Zhongping: "A Study on Laser Instruments for the Measurement of the Errors in Roll Angles" and in "Measurement method of the rolling angle" by Yin Chunyong, Xie Guangping, Cheng Xiangyin, et al. (in Journal of Tsing Hua University (Sci & Tech), 36(10)(1996) p. 86-91), however, the accuracy is affected by rotary drift. Besides, a twofold magnification nearly means a one to one measurement of the geometrical rotating angle of the polarizer, thus a comparatively low resolution results.

Prof Yin Chunyong et al. have used transversal Zeeman laser and sets the quarter-wave plate not at the angle of 45 degrees, causing the two orthogonally linear polarized lights only slightly elliptically polarized, generating a sensitivity enhanced zone at a special angle for the roll angle measurement, meanwhile the measuring light is again transmitted through the half-wave plate served as a sensor, the magnification of roll angle measurement is thus amplified four times, resulting a final measurement sensitivity enhanced up to 200 times. (See: Yin Chunyong and Liu Zhongyao: "Roll angle measurement method and instrument thereof", Chinese Patent No. 01130893.1; also Hong Jiang and Chunyong Yin: "Sensitivity enhanced roll angle measurement", Optical Engineering, 39(2)(2000) p. 516-519) With a phase meter of 0.003° resolution, the resolution of roll angle measurement can be achieved with 0.1" (0.5 arcsec). Because the phase shift is not linear related to the change of the roll angle in this method, a calibration is required, which limits the precision of the system.

The Chinese Patent No. 200810118863.3 "A roll angle measurement method and apparatus based on optical grating" discloses a new method for roll angle measurement based on grating, in which a twin optical paths differential measurement is realized by using the ±1 order diffracted beams from the grating, its resolution can reach 0.6". However, the roll angle change and the detected signal change do not have a linear relation, so a calibration is needed, thus the precision is limited.

Two-point method (or three-point method) may be used, in which linear displacements at different positions on the travel path are measured simultaneously by using optical or other sensing method so as to calculate the roll angle. The resolution of these measurement methods varies greatly according to the different means of length measurement, such as those described by Ma Junshan et al in "A study on the optical precision measurement technique for the errors in roll angle", Acta Optica, 20(10)(2000) p. 1403-1406, in which a principle is applied to the design of a differential precision angle sensor that the intensity of the reflected light will change drastically while the incident angle is changing about the critical angle, they have obtained a repetitive accuracy of 0.05". However, there is need for reference mirror and calibration, and the sensitivity for light intensity detection suffers from the influences of the light source and the signal-to-noise ratio. Furthermore, the precision of the measurement using two-point method (or three-point method) is limited by many factors. These methods are time and effort consuming, and not practical for online measurement.

SUMMARY OF THE INVENTION

One embodiment of the present invention may provide a high precision laser interferometer system for measuring minute roll angle which works stably and reliably and has simple structure.

A laser interferometer system for measuring roll angle is provided in the present invention, including a laser source, producing a first beam and generating an electrical reference signal, said first beam including two components of orthogonally linear polarization and with different frequencies, and said reference signal having a frequency corresponding to a difference between said different frequencies of said two components; a wedge prism assembly, attached to the moving mechanical apparatus whose roll angle of travel is to be measured; wedge mirror assembly, disposed in one side of the said wedge prism assembly; optical interferometry assembly, disposed between other side of said wedge prism assembly and the laser source; phase detection assembly, which indicates the measured phase, the measured phase being related to the roll angle of travel, wherein said optical interferometry assembly converts said first beam into third and fourth beams which are spatially separated, parallel, and orthogonal polarized and refracted and reflected by said wedge prism assembly and said wedge mirror assembly returning back to said optical interferometry assembly along the same paths as their incident path; said optical interferometry assembly produces the fifth and a sixth beams incident in parallel to said wedge prism assembly from said returned third and fourth beams respectively, and then said wedge prism assembly and the wedge mirror assembly refract and reflect said fifth and sixth beams to return back to said optical interferometry assembly along the same path as their incident path; said optical interferometry assembly produces said second beam from said returned fifth and sixth beams; the incident points of said third-sixth beams on said wedge prism assembly make up four apexes of a square, wherein the incident points of said third and fifth beams locate diagonally, and the incident points of said fourth and sixth beams locate diagonally at another pair of the apexes.

A laser interferometer system for measuring a minute roll angle is also provided in the present invention, including a laser source, producing a first light beam, said first beam including two components of orthogonally linear polarization with the same frequencies; a wedge prism assembly, attached to the moving mechanical apparatus whose roll angle of travel is to be measured; wedge mirror assembly, disposed at one side of the wedge prism assembly; optical interferometry assembly, disposed between other side of the wedge prism assembly and the laser source; phase detection assembly, which indicates the change of the phase difference between said two components based on a second beam, the output signal, the measured phase is related to the roll angle of travel, wherein said optical interferometry assembly converts said first beam into third and fourth beams which are spatially separated, parallel, and orthogonal polarized and refracted and reflected by said wedge prism assembly and said wedge mirror assembly returning back to said optical interferometry assembly along the same paths as their incident path; said optical interferometry assembly produces the fifth and a sixth beams incident in parallel to said wedge prism assembly from said returned third and fourth beams respectively, and then said wedge prism assembly and the wedge mirror assembly refract and reflect said fifth and sixth beams to return back to said optical interferometry assembly along the same path as their incident path; said optical interferometry assembly produces said second beam from said returned fifth and sixth beams; the incident points of said third-sixth beams on said wedge prism assembly make up four apexes of a square, wherein the incident points of said third and fifth beams locate diagonally, and the incident points of said fourth and sixth beams locate diagonally at another pair of the apexes diagonally arranged.

The optical interferometry assembly in accordance with the present invention comprising a polarizing beam splitting prism, the first quarter-wave plate, the second quarter-wave plate, and a corner cube retroreflector; said polarizing beam splitting prism receives said first optical beam from its first face and divides it into the seventh and the eighth beams being spatially separated, parallel and orthogonally polarized, and exiting from the second face; said seventh and eighth beams pass through the first quarter-wave plate and are converted into circularly polarized beams becoming the third and fourth beams; the said wedge prism assembly refract said third and fourth beams into the diverging beams which are reflected by the wedge mirror assembly with its surfaces (71A, 71B) perpendicular to the incident beams, said wedge prism assembly refracts beams into parallel beams successively which travel through the first quarter-wave plate converted into linearly polarized beams and incident on said polarizing beam splitting prism, where they are recombined and transmitted by polarization coating as ninth beam exiting from the third prism face; through said second quarter-wave plate and the corner cube retroreflector the ninth beam is converted into the tenth beam in parallel with said ninth beam but not at the same height; the tenth beam is incident on said polarizing beam splitting prism through its third face and divided therein into the eleventh and twelfth beams in parallel but orthogonal polarized with each other exiting from the second face; the eleventh and twelfth beams pass through said first quarter-wave plate becoming said fifth and sixth beams respectively, which are refracted by the wedge prism assembly and reflected by the wedge mirror assembly back again, pass through the wedge prism assembly and the first quarter-wave plate successively and enter said polarizing beam splitting prism via its second face where the two beams are recombined into a single output beam as a second beam having two orthogonally polarized components, exiting from the first face of the polarizing beam splitting prism.

Optionally, the central axes of said second face, the first quarter-wave plate, the wedge prism assembly, and the wedge mirror assembly are in parallel or on the same straight line, and the first quarter-wave plate is positioned between said polarizing beam splitting prism and the wedge prism assembly; the central axes of said corner cube, the second quarter-wave plate, and the third face are in parallel or on the same straight line, and the second quarter-wave plate is positioned between said corner cube and the polarizing beam splitting prism; said first face and third face are symmetrical about the central axis of said polarizing beam splitting prism.

Optionally, said polarizing beam splitting prism is made up of two right-angle prisms glued together along one right-angle side with polarizing coating for combining and dividing beams.

Optionally, said phase detection assembly comprising: a polarizer for mixing the orthogonal components of said second beam from said optical interferometry assembly and producing the thirteenth beam; a photoelectric detector for receiving said thirteenth beam and generating an electric measurement signal; a phase meter for receiving and comparing said electric measurement signal with said electric reference signal to obtain the relevant roll angle.

Optionally, said wedge prism assembly is comprised of two identical prisms (70A) and (70B) positioned such that their wedge directions point inward toward each other. The prism can be with double-side wedge or single-side wedge.

Optionally, said mirror assembly can be a wedge mirror assembly.

Optionally, the reflection surfaces (71A, 71B) of said wedge mirror assembly (11) has to be designed to be perpendicular to the incident beams (26, 27, 58, 59).

Optionally, the wedge angle of the single-side wedge prism assembly can be 1°, and the wedge angle of said wedge mirror equals 0.5°.

Advantages of the present invention include that the instrument does not require many optical elements, the structure of the system is simple, its application is convenient, it is easy to fabricate and has comparatively low cost. In addition, because of its complete symmetrical configuration for the two frequency components, the various influences of temperature or mechanical changes on the optical elements will be equal for both optical paths which the different frequency components travel respectively, thus it will cause no change in the phase difference, therefore, this system is stable, it has high resolution and high precision in the measurement. This system is especially suitable for the precision measurement for geometrical quantities and the establishment of the precision benchmark metrology in wide high-tech fields of military industry, aerospace engineering and digital controlled machine tools, such as the positioning or calibration of three-coordinates measuring machine, grating engraving work table, or various precision positioning stages.

BRIEF DESCRIPTION ON THE DRAWINGS

Figure 1:
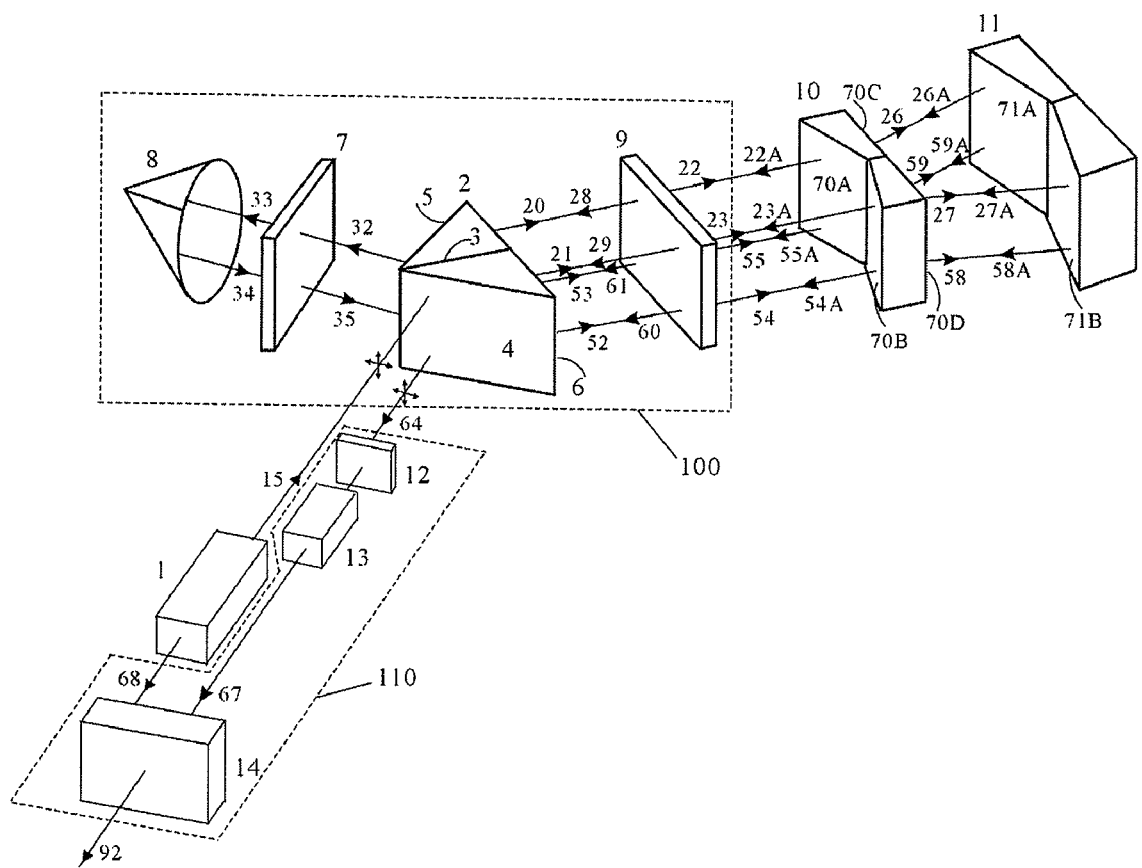
FIG. 1 is a schematic drawing of a preferred embodiment of the roll measuring interferometer system of the present invention.
Figure 3A:
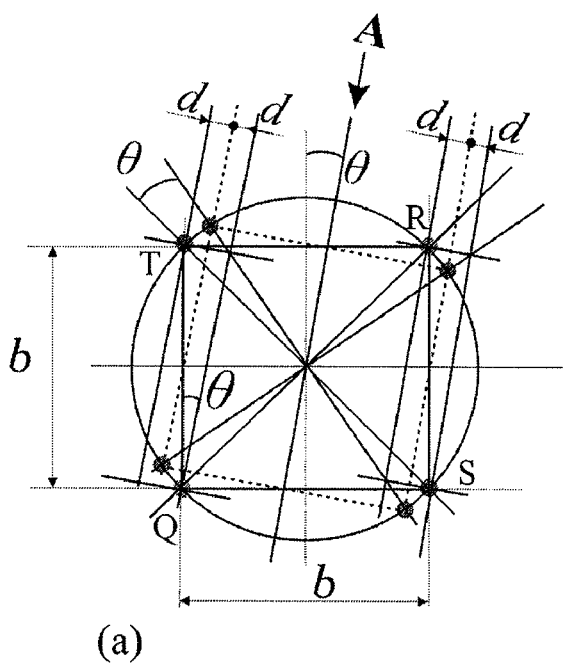
Figure 3B:
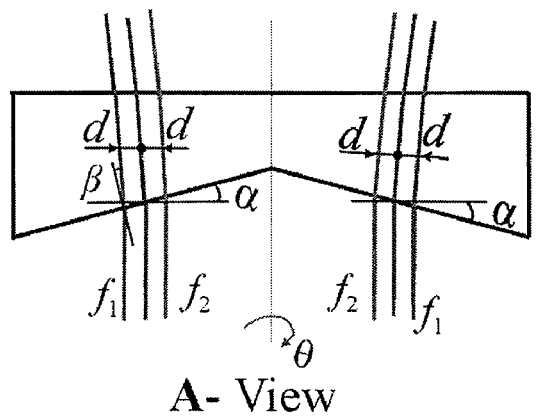

FIGS. 3(a) and 3(b) are cross section illustrations of the effect produced by the roll movement on the wedge prism assembly in the system of FIG. 1.

Figure 4:
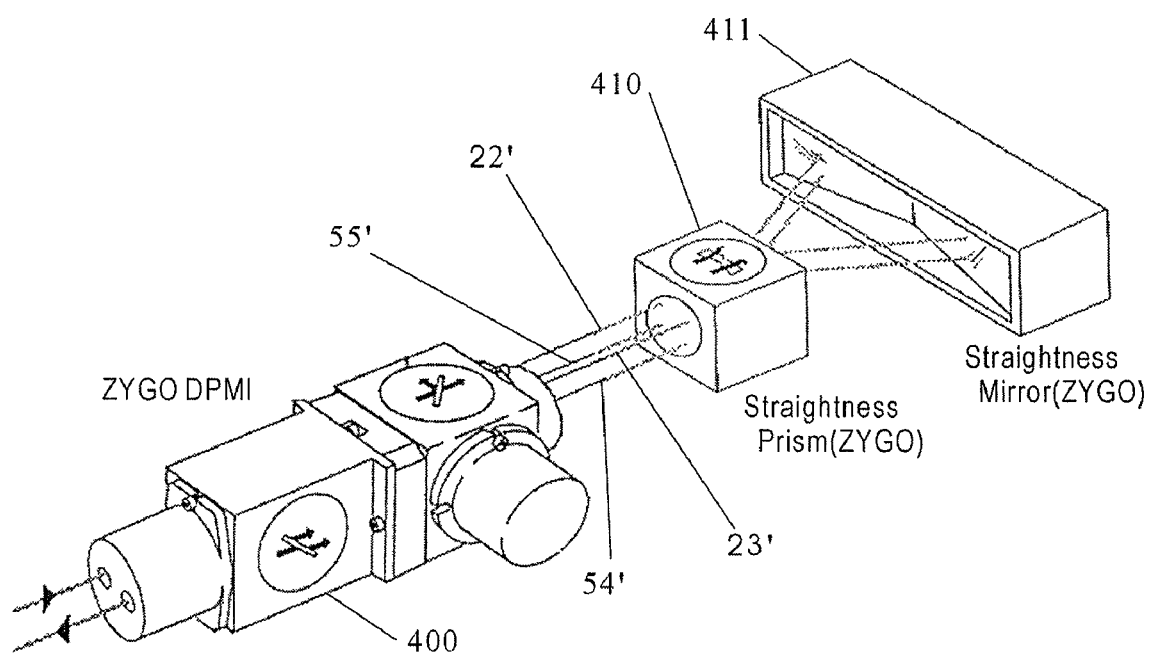

FIG. 4 is a schematic drawing of another preferred embodiment of the roll measuring interferometer system of the present invention.

DETAILED DESCRIPTION OF THE INVENTION

A more detailed description of the objectives and preferred embodiment of the present invention is given below in combination with the drawings.

FIG. 1 is a schematic diagram of a preferred embodiment of the roll measuring interferometer system of the present invention. The system comprises laser source 1, optical interferometry assembly 100, wedge prism assembly 10, wedge mirror assembly 11, phase detection assembly 110.

The optical interferometry assembly 100 therein comprises polarizing beam splitting prism 2, quarter-wave plate 9, quarter-wave plate 7, and corner cube 8. The phase detection assembly comprises polarizer 12, photoelectric detector 13, and phase meter 14.

The laser source 1, a frequency stabilized laser, emits incident beam (15) with two linear orthogonally polarized components of different optical frequency which enter the polarizing beam splitting prism 2, and at the same time provides a stable electric reference signal with a frequency equal to the frequency difference between the two stabilized components of the laser source 1.

The polarizing beam splitting prism 2 is located in the incident beam emitted by the laser source 1. Polarizing beam splitting prism 2 can, e.g., be made up of two right-angle prisms glued together with a polarizing splitting coating on the bonding face and antireflection coatings on the suitable regions of prism face 4 and prism face 6, the bonding face is equivalent to the function of a polarizing beam spliter thus it also called as polarizing beam splitting plane 3, the prism face 4 and prism face 5 with suitable areas of reflection coatings are symmetrical about polarizing beam spliting plane 3, so that the beam 15 incident on prism face 4 is divided by polarizing beam spliting plane 3 into two linear orthogonally polarized beams 16, 17 which can traverse through the prism face 6 by reflections of prism face 4 and prism face 5. Then under the combined actions of corner cube 8, wedge mirror assembly 11, quarter-wave plate 7 and quarter-wave plate 9, the beams pass through wedge prism assembly 10 twice, and finally enter the Polarizing beam splitting prism back from prism face 6 and combined into one beam which exits through prism face 4.

Disposed on the outer sides of prism face 5 and face 6 and in parallel with them respectively, quarter-wave plate 7 and quarter-wave plate 9 convert the beams passed through them into circular polarized beam, or vice versa, i.e., circular polarized beams through a quarter-wave plate will be converted into a linear polarized beam.

Corner cube 8 is placed behind the quarter-wave plate 7 with its axis perpendicular to prism face 5. The central axes of corner cube 8, quarter-wave plate 7 and prism face 5 are in parallel with one another, preferentially on the same straight line. Corner cube 8 reflects back the incident beam exited from prism face 5 and via quarter-wave plate 7 so that the reflected beam is in parallel with the incident beam but both are not at the same height.

Wedge prism assembly 10 and wedge mirror assembly 11 are placed at the back of quarter-wave plate 9 in turn and both are in parallel with prism face 6; wedge prism assembly 10 is used to refract polarizing beams incident from the fore and the back of wedge prism assembly 10, and the four polarizing beams, which are incident twice on the front surface of wedge prism assembly 10 and returned back onto the front surface of wedge prism assembly 10 twice from wedge mirror assembly 11, make up a coincident regular tetragon (square), and are arranged diagonally. In other words, each pair of the polarized beams having the same frequency are arranged diagonally. The rotation of wedge prism assembly 10 following the roll of the object to be measured causes the change of the optical path difference; wedge mirror assembly 11 is fixedly positioned for reflecting beams from wedge prism assembly 10.

Polarizer 12 is placed in parallel with prism face 4 for mixing the two orthogonal components exited from prism face 4.

Photoelectric detector 13 receives beam from polarizer 12 and generates a electric measurement signal to phase meter 14. Phase meter 14 is used to measure the phase difference between the electric signal of measurement and aforesaid electric reference signal, the change of this phase difference is in proportional to the optical path difference caused by the roll of wedge prism assembly 10.

Although the wedge prism assembly shown in FIG. 1 is a single-side wedge prism assembly, there is no restriction in the present invention, it can also be, e.g., a double-side wedge prism assembly.

In the preferred embodiment shown in FIG. 1, mirror assembly 11 can be but not limited to a wedge angle mirror.

In the preferred embodiment shown in FIG. 1, when said wedge prism assembly is a single-side wedge prism assembly, the wedge angle of said wedge mirror assembly equals a half of the wedge angle of the single-side wedge prism assembly; when said wedge prism assembly is a double-side wedge prism assembly, the wedge angle of said wedge mirror assembly equals a quarter of the wedge angle of the double-side wedge prism assembly.

In the preferred embodiment shown in FIG. 1, the wedge angle of the single-side wedge prism assembly preferably equals 1°, and the wedge angle of said wedge angle mirror equals 0.5°.

Figure 2:
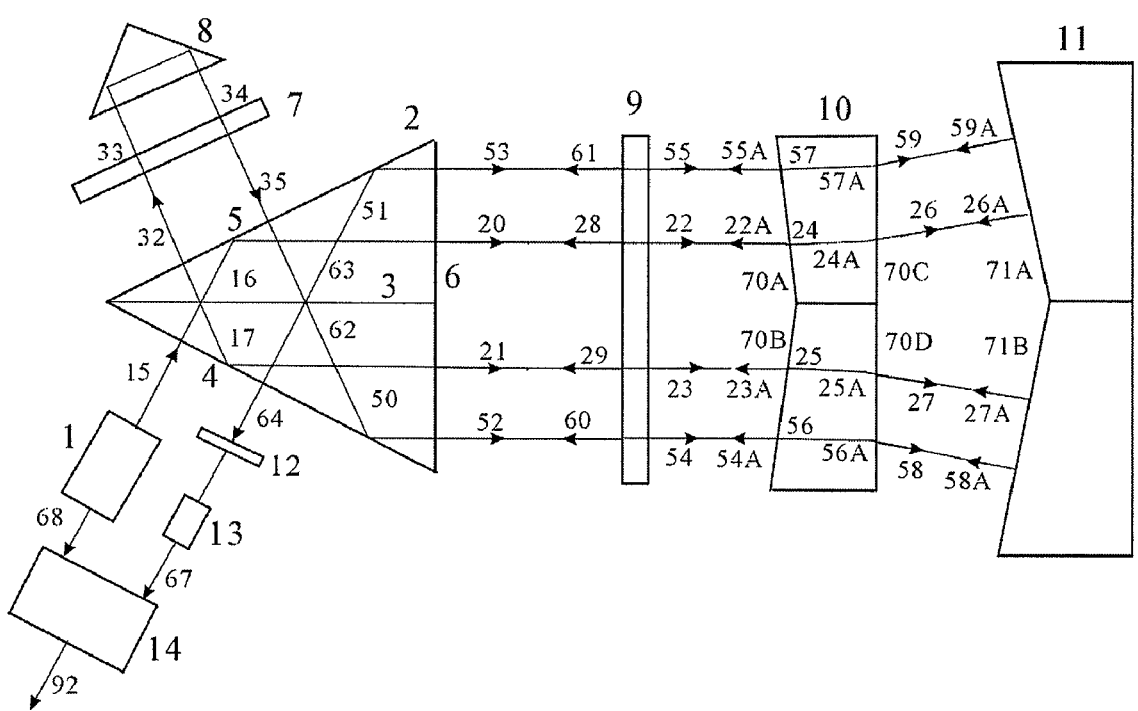
FIG. 2 depicts a schematic diagram of the optical paths in plan view of the roll measuring interferometer system of FIG. 1.

FIG. 2 depicts a schematic diagram of the optical paths in plan view of the roll measuring interferometer system of FIG. 1.

Laser source 1 emits beam 15 incident on prism face 4 of polarizing beam splitting prism 2, and provides electric reference signal 68 to phase meter 14. The polarizing beam splitting plane 3 with polarizing spliting coating divides the two orthogonally polarized components of the incident beam into a p-beam 16 in parallel with the incident face and a s-beam 17 perpendicular to the incident face. Through the reflections by prism face 4 and prism face 5, said two beams exit polarizing beam splitting prism 2 from prism face 6 as beams 20 and 21.

Beams 20 and 21 are converted by quarter-wave plate 9 into circular polarized beams 22 and 23, respectively, beams 22 and 23 are refracted by wedge prism assembly 10 into diverging beams 26 and 27. Light beams 26 and 27 are reflected by wedge mirror assembly 11 with its surfaces 71A and 71B perpendicular to the beams 26 and 27 for producing converging beams (26A, 27A) which are refracted by the wedge prism assembly (10) to produce parallel beams (22A, 23A). Light beams 22A and 23A are converted once again by quarter-wave plate 9 into linear polarized beams 28 and 29 with their polarization orthogonal to that of the original incident beams 20 and 21, then inside the polarizing beam splitting prism 2, beams 28 and 29 are reflected respectively by prism face 4 and face 5 to polarizing splitting face 3 and recombined thereon into beam 32 having two orthogonally polarized components.

Light beam 32 exited out of polarizing beam splitting prism 2 is converted by quarter-wave plate 7 to beam 33, then reflected by corner cube 8 as beam 34, then converted by quarter-wave plate 7 to beam 35, beam 33 and beam 34 are in parallel but not at the same height due to the characteristic of corner cube 8.

Light beam 35 incident once again into polarizing beam splitting prism 2 is divided by the polarizing splitting face 3 into two orthogonal polarized beams 50 and 51, which originate from the incident beams 20 and 21 respectively. Light beams 50 and 51 are reflected by prism face 4 and face 5 out of polarizing beam splitting prism 2 as beams 52 and 53 which pass through quarter-wave plate 9 and become beams 54 and 55 incident once more on the front surface of the wedge prism assembly, their incident points together with that of beams 22 and 23, which are firstly incident on the front surface of the wedge prism assembly, form a regular tetragon. Moreover, they are arranged diagonally. In other words, each pair of the polarized beams having the same frequency are arranged diagonally. Light beams 54 and 55 are refracted by wedge prism assembly 10 into diverging beams 58 and 59, they are reflected by faces 71B and 71C of wedge mirror assembly 11 into converging beams 58A and 59A which are refracted by wedge prism assembly 10 to produce parallel beams 54A and 55A, their incident points together with that of beams 22A and 23A, that are firstly returned back on the front surface of the wedge prism assembly, also form a regular tetragon, which is coincident with said regular tetragon formed by beams 22, 23, 54, and 55. Light beams 54A and 55A pass again through quarter-wave plate 9 and are converted to linear polarized beams 60 and 61 having polarization orthogonal to that of the original incident beams 52 and 53, beams 60 and 61 enter polarizing beam splitting prism 2 and are reflected by prism face 4 and prism face 5 onto polarizing splitting face 3, via transmission and reflection thereon, they are recombined into beam 64. Light beam 64 passes through polarizer 12 and is received by photoelectric detector 13. The photoelectric detector 13 outputs a electric measurement signal 67 to the phase meter 14 wherein the phase difference between signal 67 and electric reference signal 68 is measured.

Referring to FIGS. 3(a) and 3(b), the details of the calculation of said phase difference are described below.

A two frequency laser interferometer is such a interferometer wherein two orthogonal polarized laser beams with different frequency f1 and f2, are used to form the interference. These two laser beams pass separately the different interference arms so that their returning beams carry different information of optical phases, when the two beams meet again, measurement signal with beat frequency, a difference of frequencies f1 and f2, will be produced, if it is phase compared with the reference signal, having a frequency equal to the beat frequency, a linear relationship between the phase difference $\Delta\phi$ and the optical path difference $\Delta l$ of the two interference arms can be obtained as follows:

$$\Delta l = \frac{\lambda}{2\pi}\Delta\varphi \quad (1)$$

wherein $\lambda$ is the central wave length of the laser, $\Delta\phi$ can be measured by the phase meter, thus the path difference $\Delta l$ can be determined. If $\Delta l$ is caused by said displacement, the length of the displacement can be obtained from this.

In the interferometer system of the present invention, beam of each frequency component passes the same geometrical distance, however, whether the optical path nl (n is the refractivity of the medium in the optical path, 1 is the geometrical distance that the beam passes) is the same or not depends on the position of the wedge prism assembly. While the wedge prism assembly rotates along with the object to be measured, the path lengths that the two frequency components pass through the wedge prism assembly and air will change, thus the respective optical path nl of the two frequency components will also change, causing a change of measured optical phase difference.

As mentioned above, the incident and outgoing position of the beams of the different frequencies, f1 and f2 on the wedge prism assembly make up a spatial four symmetrical paths. If the incident and outgoing positions of f1 beam on the wedge prism assembly are T and S, respectively, and the incident and outgoing positions of f2 beam on the wedge prism assembly are Q and R, respectively. Whether or not a roll of the object to be measured occurs, said positions, T, Q, R, and S, of the four beam incident positions are fixed, they form a regular square with a side length of b, as shown in FIG. 3(a). While the wedge prism assembly rotates an angle θ with the roll of object to be measured, said four beam incident points are still at their original positions, whereas the previous four points of incident beams on the front of the wedge prism assembly have rotated an angle of θ. If an observation is made from a direction perpendicular to the transversal cross section of the wedge prism assembly, e.g., from the direction of arrow A shown in FIG. 3(a), the two paths of beam f1 have a deviation towards the outer edge of the wedge prism assembly relative to paths before the roll, i.e. the distance that the beam passes in the glass has increased; on the other hand, the two paths of beam f2 deviate towards the vertex of the wedge angle, i.e. the distance that the beam passes in the glass has decreased, as shown in FIG. 3(b).

The four paths demonstrate a central symmetry, thus the amount of each of their deviations has equal absolute value, set as d. θ is the roll angle, as shown in FIG. 3(a), $$\sin\theta = \frac{2d}{b} \quad (2)$$

If the wedge prism assembly is made of glass and its external medium is air (if air is substituted as vacuum or other medium, the derivations here still hold true), their medium constants are not the same. Therefore, though the total geometrical distances passed by the beams of both frequencies keep constant, their optical paths have changed. As shown in FIG. 3(b), on the transversal cross section of the wedge prism assembly, $f_1$ beam deviates outwards, thus passes an increased glass distance, i.e. its optical path increases; whereas $f_2$ beam deviates inwards, thus passes a decreased glass distance, i.e. its optical path is reduced. Because the four optical paths have a central symmetry, the absolute values of the geometrical distances of their deviations are equal, resulting equal absolute values of the corresponding optical path differences. Supposing that the absolute value of the change of the distance that beam passes through the wedge prism assembly is l, α is wedge angle of the wedge prism assembly, then $$l = d \sin\alpha \quad (3)$$

wherein l is directly related to optical path difference Δl. Because beams of both frequency always pass through the wedge prism assembly four times, in addition, one of the optical path changes of both frequencies is positive and the other is negative, the total optical path difference Δl thus relates to l in the following equation:

$$\Delta l = 8l(n_g - n_{air}) \quad (4)$$

wherein $n_g$ and $n_{air}$ are refractivities of glass and air, respectively. Supposing glass refractivity is 1.5, air refractivity is approximately 1.00027 (can be taken as 1.0 approx.), their difference is about 0.5, thus $$\Delta l = 4l = 4d \sin\alpha \quad (5)$$

Therefore, we get:

$$\sin\theta = \frac{2\Delta l}{4b\sin\alpha} = \frac{1}{2b\sin\alpha}\left(\frac{\lambda}{2\pi}\right)\Delta\varphi = \frac{\lambda}{4\pi b\sin\alpha}\Delta\varphi \quad (6)$$

Because α, b, and λ can be predetermined, when phase change Δφ of optical path difference can be measured by phase comparison between signal of measurement and the reference signal, the roll angle θ can be determined by equation (6).

For a laser interferometer system with a single frequency, two beams, which have the same frequency and two polarized directions perpendicular to each other, travel different arms in the interferometer system and thus carry different information concerning optical phases while returning. Then, an interference signal for measuring will be generated by combining the two beams. Therefore, a linear relationship between the phase difference Δφ and the optical path difference Δl presented in equation (1) can be determined by measuring the phase. The following calculation is similar to those described above.

In the above embodiment, a specific structure of the laser interferometer system is described. However, it should be noted that the specific structure is illustrative and is not intended to limit the scope of the present invention. It should be appreciated that one skilled in the art can employ those with other structures to implement the present invention as long as with such structures, the four beams, i.e., 22, 23, 54, and 55, incident on a surface of the wedge prism assembly, locate at four apexes of a square, respectively and each pair of the beams having the same frequency are arranged diagonally.

FIG. 4 depicts in schematic form the configuration of a laser interferometer system according to another preferred embodiment of the present invention. As shown in FIG. 4, the laser interferometer system comprises a laser source (not shown), optical interferometry assembly 400, prism assembly 410 attached to the object whose roll angle of travel is to be measured (not shown), mirror assembly 411, phase detection assembly (not shown). The optical interferometry assembly 400 can be implemented in form of, e.g., a Differential Plane Mirror Interferometer manufactured by Zygo Corporation at Middlefield, Conn., USA or Agilent Technologies, Inc. at Santa Clara Calif. 95051, USA. Also, a straightness prism and a straightness mirror from Zygo Corporation may be used as prism 410 and mirror assembly 411, respectively.

In FIG. 4, a beam from the laser source, which is indicated by an arrow pointing to the optical interferometry assembly 400, enters the optical interferometry assembly 400. The beam comprises two linear orthogonally polarized beams with two different frequencies. The optical interferometry assembly 400 splits the beam into two beams 22', 23' corresponding to the two frequencies, respectively and directs them to the prism 410. The beams 22', 23' pass the prism 410 and arrive at the mirror assembly 411, by which they are reflected to the prism 410. Then, the beams 22', 23' go through the prism 410 and enter the optical interferometry assembly 400. In the optical interferometry assembly 400, the beams 22', 23' are transformed into two beams 54', 55', which are incident on the prism 410, so that the four beams 22', 23', 54' and 55', incident on the wedge prism assembly, locate at four apexes of a square on the front of the wedge prism assembly respectively. The beams 54' and 55' are reflected by the mirror assembly 411 and pass the prism 410 so as to enter the optical interferometry assembly 400, where they are combined into one beam (see one indicated by an arrow opposite to the optical interferometry assembly 400) and output to phase detection assembly for measuring a change of phase difference.

The preferred embodiments of the present invention as described above are applicable to measure a minute roll angle of linear displacement with a high precision. In such case, the parameter α is selected as a small quantity, for example, 1 degree. The parameter b can be selected as 10 mm. Thus, with a phase meter of 0.01° resolution, the resolution of roll angle measurement can reach 0.056 μrad (0.011 arcsec). Further, if using a phase meter with 0.003° resolution, the resolution of roll angle measurement can reach 0.017 μrad (0.03 arcsec). From the above, some embodiments according to the present invention can reach higher resolution as compared to the prior art.

In summary, the principle and spirit of the present invention are described by means of the preferred embodiments. Double frequency laser interferometer is exemplified in the above illustrations, however, it should be noted that the principle and spirit of the present invention can also be suitable to a single frequency laser interferometer system, wherein laser source emits two beams of orthogonal polarizations with the same frequency. As for above preferred embodiments, when applied to a single frequency laser interferometer system, only some change needs to be made to the layout shown in FIG. 1, for example, an electric reference signal is not needed to be provided by laser source 1 to phase meter 14, which can determine the phase change Δφ based on signal from detector 13. As to the configuration in the optical paths (i.e. optical interferometry assembly 100, wedge prism assembly 10, and mirror assembly 11, shown in FIG. 1), no change is needed.

The foregoing has described the principles and embodiments of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A laser interferometer system for measuring roll angle of linear displacement, the laser interferometer system comprising:
    a laser source to produce:
        a first beam including two components of orthogonally linear polarization and with different frequencies, and
        an electrical reference signal having a frequency corresponding to a difference between the different frequencies of the two components;
    a wedge prism assembly to:
    move in conjunction with an object to be measured;
    a mirror assembly, disposed at one side of the wedge prism assembly;
    an optical interferometry assembly, disposed between another side of said wedge prism assembly and the laser source;
    a phase detection assembly to:
        determine a change of a phase difference between the two components based on the reference signal and a second beam incoming from said optical interferometry assembly, and
        obtain a roll angle of the object to be measured based on the determined change of the phase difference;
    said optical interferometry assembly being to:
        reflect the first beam towards the wedge prism assembly and the mirror assembly, along a first path, where reflecting the first beam produces a third beam and a fourth beam, incident and in parallel to said wedge prism assembly, from said first beam,
    the wedge prism assembly and the mirror assembly being to:
        cause said third beam and the fourth beam to return back to said optical interferometry assembly along the first path,
    said optical interferometry assembly being further to:
        reflect the returned third beam and the returned fourth beam towards the wedge prism assembly and the mirror assembly, along a second path, to produce a fifth beam and a sixth beam, incident and in parallel to said wedge prism assembly, from said returned third beam and the returned fourth beam, respectively,
    the wedge prism assembly and the mirror assembly being further to:
        cause the fifth beam and the sixth beam to return back to said optical interferometry assembly along the second path,
    said optical interferometry assembly being further to:
        produce said second beam from the returned fifth beam and the returned sixth beam,
    the third beam, the fourth beam, the fifth beam, and the sixth beam being incident on said wedge prism assembly to cause incident points of the third beam, the fourth beam, the fifth beam, and the sixth beam, to comprise four apexes of a square, spots of said third beam and the fifth beam, passing through the wedge prism assembly, being located at a diagonally arranged pair of the four apexes, and spots of said fourth beam and the sixth beam, passing through the wedge prism assembly, being located at another diagonally arranged pair of the four apexes,
    where said optical interferometry assembly comprises a polarizing beam splitting prism, a first quarter-wave plate, a second quarter-wave plate, and a corner cube,
    where the polarizing beam splitting prism being opposite to the laser source, the first quarter-wave plate being positioned between the corner cube and the polarizing beam splitting prism, the second quarter-wave plate being positioned between the polarizing beam splitting prism and the wedge prism assembly, the first quarter-wave plate and the second quarter-wave plate being in parallel with a first face and a second face of the polarizing beam splitting prism, respectively, the corner cube having an axis perpendicular to the first face,
    where the polarizing beam splitting prism is further to:
        receive said first beam via a third face of the polarizing beam splitting prism, and
        divide said first beam into a seventh beam and an eighth beam in parallel with, but orthogonal to, each other,
    where the seventh beam and the eighth beam exit the polarizing beam splitting prism via a fourth face of the polarizing beam splitting prism,
    where the seventh and eight beam pass through the second quarter-wave plate and exit the second quarter-wave plate,
    where, when exiting the second quarter-wave plate, the seventh beam and the eighth beam correspond to the third beam and the fourth beam,
    where the third beam and the fourth:
        pass through the wedge prism assembly,
        enter into the mirror assembly,
        are reflected within the mirror assembly, and
        travel, via the wedge prism assembly and the second quarter-wave plate, successively, into the polarizing beam splitting prism for treatment,
    where the polarizing beam splitting prism is further to:
        emit a ninth beam, via the first face of the polarizing beam splitting prism,
    where the emitted ninth beam is to travel through the first quarter-wave plate,
        enter into and be reflected by the corner cube,
        travel, in response to being reflected by the corner cube, back through the first quarter-wave plate, and
        exit the first quarter-wave plate,
    where, when exiting the first quarter-wave plate, the ninth beam corresponds to a tenth beam being in parallel with but at a different height from the ninth beam,
    where the tenth beam:
        enters into the polarizing beam splitting prism via the first face of the polarizing beam splitting prism, and
        divides, based on entering the polarizing beam splitting prism, into an eleventh beam and a twelfth beam,
    where the eleventh beam and the twelfth beam are in parallel, but orthogonal, with each other and exit the polarizing beam splitting prism via the second face of the polarizing beam splitting prism, where the eleventh and twelfth beam pass through the second quarter-wave plate, where, when exiting the second quarter-wave plate, the eleventh beam and the twelfth beam correspond to said fifth beam and the sixth beam, where the fifth beam and the sixth beam:
  travel through the wedge prism assembly,
  enter into the mirror assembly, and
  after being reflected within the mirror assembly, enter, via the wedge prism assembly and the second quarter-wave plate, successively, into the polarizing beam splitting prism via the third face of the polarizing beam splitting prism, for treatment, where the treatment of the fifth beam and the sixth beam within the polarizing beam splitting prism, combines the fifth beam and the sixth beam to form the second beam, and where the second beam exits the polarizing beam splitting prism via the third face of the polarizing beam splitting prism.

2. The laser interferometer system of claim 1, where central axes of said second face of the polarizing beam splitting prism, the second quarter-wave plate, the wedge prism assembly, and the mirror assembly are in parallel or on a same straight line;
  where central axes of said corner cube, the first quarter-wave plate, and the first face are in parallel or on another same straight line; and
  where said first face of the polarizing beam splitting prism and the second face of the polarizing beam splitting prism are symmetrical about the central axis of said polarizing beam splitting prism.

3. The laser interferometer system of claim 2, where said polarizing beam splitting prism comprises two right-angle prisms connected along one right-angle side of the two right-angle prisms, and
  where a layer of polarizing splitting coating plated is positioned on a bonding face of the two right-angle prisms for combining and dividing beams thereon.

4. The laser interferometer system of claim 1, where said phase detection assembly comprises:
  a polarizer to:
    mix the orthogonal components of said second beam, and
    produce a thirteenth beam;
  a photoelectric detector to:
    receive the thirteenth beam, and
    generate an electric measurement signal; and
  a phase meter to receive and compare the electric measurement signal with said electric reference signal to obtain a minute roll angle.

5. The laser interferometer system of claim 1, where said wedge prism assembly comprises:
  a double-side wedge angle, or
  a single-side wedge angle.

6. The laser interferometer system of claim 1, where said mirror assembly is a wedge mirror assembly.

7. The laser interferometer system of claim 5, where, when said wedge prism assembly comprises a single-side wedge prism assembly, a wedge angle of said wedge mirror equals one half of a wedge angle of said single-side wedge prism assembly; and
  where, when said wedge prism assembly comprises a double-side wedge prism assembly, a wedge angle of said wedge mirror equals a quarter of a wedge angle of said double-side wedge prism assembly.

8. The laser interferometer system of claim 6, wherein the wedge prism assembly comprises a single-side wedge prism assembly,
  where a wedge angle of the single-side wedge prism assembly equals 1°, and
  where a wedge angle of said wedge angle mirror is 0.5°.

9. A laser interferometer system for measuring roll angle of linear displacement, the laser interferometer system comprising:
  a laser source to produce a first beam, said first beam including two components of orthogonally linear polarization;
  a wedge prism assembly to move along with an object to be measured;
  a mirror assembly, disposed at one side of the wedge prism assembly;
  an optical interferometry assembly, disposed between another side of the wedge prism assembly and the laser source; and
  a phase detection assembly to:
    receive a second beam from the optical interferometry assembly,
    determine a change of a phase difference between said two components based on the second beam received from said optical interferometry assembly, and
    obtain a roll angle of said object to be measured,
  said optical interferometry assembly being to:
    produce a third beam and a fourth beam, incident and in parallel to said wedge prism assembly, from said first beam,
  said wedge prism assembly and the mirror assembly being to:
    cause said third beam and the fourth beam to return back to said optical interferometry assembly along a same path as an incident path of the third beam and the fourth beam,
  said optical interferometry assembly being further to:
    produce a fifth beam and a sixth beam, incident and in parallel to said wedge prism assembly, from said returned third beam and the returned fourth beam, respectively,
  said wedge prism assembly and the mirror assembly being further to:
    cause said fifth beam and the sixth beam to return back to said optical interferometry assembly along a same path as an incident path of the fifth beam and the sixth beam,
  said optical interferometry assembly being further to:
    produce said second beam from said returned fifth beam and the returned sixth beam,
  the third beam, the fourth beam, the fifth beam, and the sixth beam being incident on said wedge prism assembly to cause incident points of the third beam, the fourth beam, the fifth beam, and the sixth beam to comprise four apexes of a square,
    spots associated with the third beam and the fifth beam being located at a diagonally arranged pair of the four apexes, and
    spots associated with the fourth beam and the sixth beam being located at another diagonally arranged pair of the four apexes,
  where the optical interferometry assembly comprises a polarizing beam splitting prism, a first quarter-wave plate, a second quarter-wave plate, and a corner cube,
  where the polarizing beam splitting prism being opposite to the laser source, the first quarter-wave plate being positioned between the corner cube and the polarizing beam splitting prism, the second quarter-wave plate being positioned between the polarizing beam splitting prism and the wedge prism assembly, the first quarter-wave plate and the second quarter-wave plate being in parallel with a first face and a second face of the polarizing beam splitting prism, respectively, the corner cube having an axis perpendicular to the first face, where the polarizing beam splitting prism is further to:
receive the first beam via a third face, and
divide the first beam into a seventh beam and an eighth beam, where the seventh beam and the eighth beam are in parallel, but orthogonal, with each other where the seventh beam and the eighth beam pass through the second quarter-wave plate and exit the second quarter-wave plate, where, when exiting the second quarter-wave plate, the seventh and eighth beam correspond to the third beam and the fourth beam, where the third beam and the fourth beam:
pass through the wedge prism assembly,
enter into the mirror assembly,
are reflected within the mirror assembly, and
travel, via the wedge prism assembly and the second quarter-wave plate, successively, into the polarizing beam splitting prism for treatment, where the polarizing beam splitting prism is further to:
emit a ninth beam, via the first face of the polarizing beam splitting prism, where the emitted ninth beam is to:
travel through the first quarter-wave plate,
enter into and be reflected by the corner cube,
travel in response to being reflected by the corner cube, back through the first quarter-wave plate, and
exit the first quarter-wave plate, where, when exiting the first quarter-wave plate, the ninth beam corresponds to a tenth beam being in parallel with, but at a different height from the ninth beam, where the tenth beam:
enters into the polarizing beam splitting prism via the first face of the polarizing beam splitting prism, and
divides, based on entering the polarizing beam splitting prism, into an eleventh beam and a twelfth beam, where the eleventh beam and the twelfth beam are in parallel, but orthogonal, with each other and exit the polarizing beam splitting prism via the second face of the polarizing beam splitting prism, where the eleventh beam and the twelfth beam pass through the second quarter-wave plate, where, when exiting the second quarter-wave plate, the eleventh beam and twelfth beam correspond to said fifth beam and the sixth beam, where the fifth beam and the sixth beam:
pass through the wedge prism assembly,
enter into the mirror assembly,
after being reflected by the mirror assembly, travel, via the wedge prism assembly and the second quarter-wave plate, successively, into the polarizing splitting prism via the third face of the polarizing beam splitting prism, and
exit, via the third face of the polarizing beam splitting prism, where, when exiting the polarizing beam splitting prism, the fifth beam and the sixth beam are combined and correspond to the second beam.

10. The laser interferometer system of claim 9, where central axes of said second face of the polarizing beam splitting prism, the second quarter-wave plate, the wedge prism assembly, and the mirror assembly are in parallel or on a same straight line,
where central axes of said corner cube, the second first quarter-wave plate, and the first face of the polarizing beam splitting prism are in parallel or on a same straight line, and
where said first face of the polarizing beam splitting prism and the second face of the polarizing beam splitting prism are symmetrical about the central axis of said polarizing beam splitting prism.

11. The laser interferometer system of claim 10, where said polarizing beam splitting prism comprises two right-angle prisms connected along one right-angle side of each of the two right-angle prisms, and
where a layer of spectropolarifilm is plated on a bonding face of the two right-angle prisms for combining and dividing beams thereon.

12. The laser interferometer system of claim 9, where said wedge prism assembly comprises a double-side wedge angle or a single-side wedge angle.

13. The laser interferometer system of claim 9, where said mirror assembly is a wedge angle mirror.

14. The laser interferometer system of claim 12, where, when said wedge prism assembly is a single-side wedge prism assembly, a wedge angle of said wedge angle mirror equals one half of a wedge angle of said single-side wedge prism assembly, and
where, when said wedge prism assembly is a double-side wedge prism assembly, a wedge angle of said wedge angle mirror equals one quarter of a wedge angle of said double-side wedge prism assembly.

15. The laser interferometer system of claim 13, where the wedge prism assembly comprises a single-side wedge prism assembly and a wedge angle of the single-side wedge prism assembly equals 1°, and a wedge angle of said wedge angle mirror equals 0.5°.

* * * * *

UNITED STATES PATENT AND TRADEMARK OFFICE
CERTIFICATE OF CORRECTION

PATENT NO. : 8,325,348 B2
APPLICATION NO. : 12/541564
DATED : December 4, 2012
INVENTOR(S) : Wenmei Hou et al.

It is certified that error appears in the above-identified patent and that said Letters Patent is hereby corrected as shown below:

Claim 9, column 15, line 12 should read: "are in parallel but orthogonal, with each other,"
Claim 9, column 15, line 33 should read: "travel, in response to being reflected by the corner cube,"
Claim 9, column 16, line 6 should read: "wave plate, successively, into the polarizing beam splitting"
Claim 10, column 16, line 17 should read: "where central axes of said corner cube, the first"

Signed and Sealed this
Twenty-ninth Day of January, 2013

David J. Kappos
*Director of the United States Patent and Trademark Office*